United States Patent
Tokkonen et al.

(10) Patent No.: US 7,158,176 B2
(45) Date of Patent: Jan. 2, 2007

(54) PRIORITIZATION OF FILES IN A MEMORY

(75) Inventors: Timo Tokkonen, Oulu (FI); Jakke Makela, Turku (FI)

(73) Assignee: Nokia Corporation, Espoo (FI)

( * ) Notice: Subject to any disclaimer, the term of this patent is extended or adjusted under 35 U.S.C. 154(b) by 616 days.

(21) Appl. No.: 10/087,465

(22) Filed: Mar. 1, 2002

(65) Prior Publication Data

US 2003/0166399 A1 Sep. 4, 2003

(51) Int. Cl.
*H04N 5/76* (2006.01)
*H04M 3/00* (2006.01)

(52) U.S. Cl. .............................. 348/231.99; 348/207.11; 455/419

(58) Field of Classification Search ........... 348/231.99, 348/231.2, 231.5, 231.9, 552, 207.2, 207.99, 348/207.1, 207.11; 345/2.1; 455/419, 418, 455/556.1, 66.1; 707/1; 365/229
See application file for complete search history.

(56) References Cited

U.S. PATENT DOCUMENTS

| | | | |
|---|---|---|---|
| 5,893,037 A * | 4/1999 | Reele et al. ............. | 455/556.1 |
| 6,584,490 B1 * | 6/2003 | Schuster et al. ............ | 709/200 |
| 2001/0006500 A1 * | 7/2001 | Nakajima et al. ........ | 369/47.35 |
| 2001/0023438 A1 * | 9/2001 | Ishida ........................ | 709/224 |
| 2001/0050875 A1 * | 12/2001 | Kahn et al. ................. | 365/229 |
| 2002/0033779 A1 * | 3/2002 | Nakai et al. ................. | 345/2.1 |
| 2002/0041757 A1 * | 4/2002 | Takahashi .................... | 386/95 |
| 2002/0107587 A1 * | 8/2002 | Araki .......................... | 700/68 |
| 2002/0118285 A1 * | 8/2002 | Misawa et al. .......... | 348/231.1 |
| 2003/0054833 A1 * | 3/2003 | Hayduk ...................... | 455/456 |
| 2003/0103148 A1 * | 6/2003 | Ejima et al. ............. | 348/231.3 |
| 2004/0236719 A1 * | 11/2004 | Horvitz ........................ | 707/1 |
| 2005/0138448 A1 * | 6/2005 | Chew ......................... | 713/300 |

* cited by examiner

*Primary Examiner*—Aung Moe
(74) *Attorney, Agent, or Firm*—Harrington & Smith, LLP

(57) ABSTRACT

A mobile electronic apparatus including a memory and a system for prioritizing the user stored files in the memory relative to one another. The memory includes user stored files therein. Each user stored file has more than one different prioritization parameter associated therewith. The system for prioritizing the user stored files in the memory relative to one another includes a system for prioritizing the user stored files relative to each other based upon at least two of the different prioritization parameters.

26 Claims, 13 Drawing Sheets

PRIORITIZATION OF FILES IN A MEMORY

BACKGROUND OF THE INVENTION

1. Field of the Invention

The present invention relates to storage of files in a memory and, more particularly, to prioritization of files based upon multiple parameters.

2. Brief Description of Prior Developments

Mass memories in mobile terminals will always have limited capacities. Therefore some prioritization must be done so that the memory would have capacity for the most important files.

A Cellular Mobile Telephone (CMT) environment differs fundamentally from a smart Internet browser cache system because the terminal-server interface is basically slow, bandwidth-limited, and high-cost. The bandwidth between a browser cache and the personal computer (PC), on the other hand, is extremely fast, flexible, and free. The prior art basically leaves all prioritization decisions to be done by the user. Typical Internet browser caches simply delete files from the older end. Basically, in the conventional devices, the prioritization decision is done by the user or an automatic prioritization is done based on only one parameter; for example, such as time or use.

Mass memory in future mobile terminals, such as digital convergence (DCU) products, are also expected to have limited capacities. Specifically, a major problem in DCU products is the fact that applications tend to take up large amounts of permanent memory. However, the size of memory in DCU products is extremely constrained by cost and the current state of the technology. There is a desire to find a way to use limited amounts of storage space in a highly efficient and flexible way; especially in mobile terminals and digital convergence (DCU) products, but also in other small electronic devices which have user input data/image/music/video files.

SUMMARY OF THE INVENTION

In accordance with one aspect of the present invention, a mobile electronic apparatus is provided including a memory and a system for prioritizing the user stored files in the memory relative to one another. The memory includes user stored files therein. Each user stored file has more than one different prioritization parameter associated therewith. The system for prioritizing the user stored files in the memory relative to one another includes means for prioritizing the user stored files relative to each other based upon at least two of the different prioritization parameters.

In accordance with one method of the present invention, a method of prioritizing a plurality of user stored files relative to each other in a mobile electronic apparatus is provided comprising steps of storing the user stored files in a memory of the mobile electronic apparatus; associating more than one different prioritization parameter with each user stored file; and prioritizing the user stored files relative to each other based upon at least two of the prioritization parameters associated with each of the files.

In accordance with another method of the present invention, a method of prioritizing a plurality of files relative to each other in a memory of an electronic apparatus is provided comprising steps of associating more than one different prioritization parameter for each of the files in the memory, a first one of the prioritization parameters comprising a value judgment parameter consisting of either a user input value judgment parameter or a default value judgment parameter; and prioritizing the files relative to one another based upon the value judgment parameter respectively associated with the files and at least one other of the prioritization parameters respectively associated with the files.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
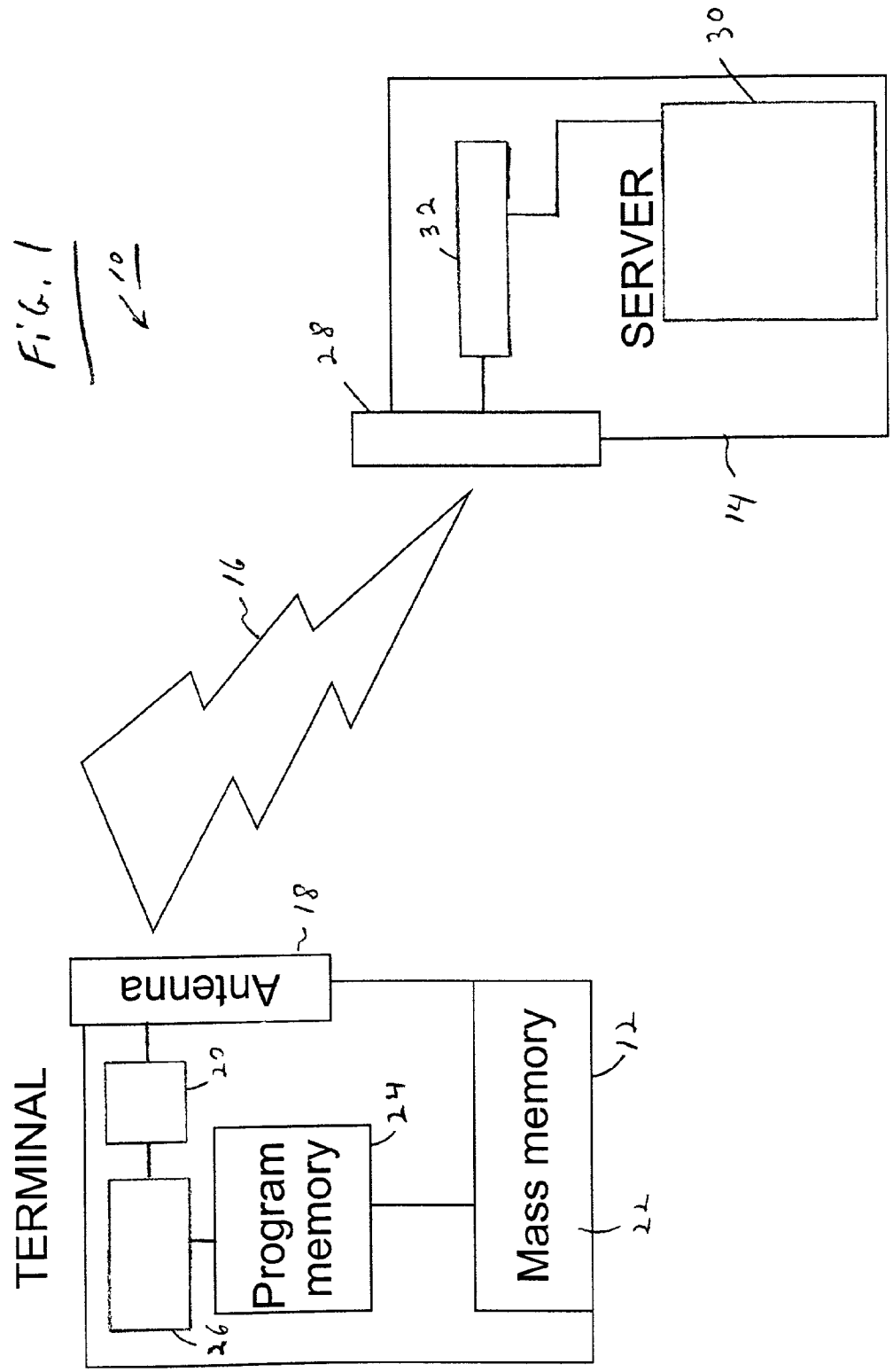
FIG. 1 is a block diagram of a system incorporating features of the present invention.

Referring to FIG. 1, there is shown a block diagram of a system 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The system 10 the generally comprises a terminal 12, a remote server 14, and a link 16 therebetween. In alternate embodiments, the system 10 could comprise additional or alternative components. The terminal 12, in the embodiment shown, can comprise a mobile electronic apparatus such as, for example, a mobile telephone, a personal data assistant (PDA), a mobile communicator, a laptop or notebook computer, or even a music player. In the embodiment shown, the terminal 12 comprises an antenna 18, a transceiver 20, a mass memory 22, a program memory 24, and a controller 26. The terminal 12 obviously comprises other components. For example, in a mobile telephone or mobile communicator the terminal 12 could comprise a display screen, a user interface such as a touch screen or keys, a battery, a microphone and a speaker or sound transducer. The present invention can cover various types of uses that can happen without controls, over the ear, perhaps otherwise wished/generated by the user. In other words, there doesn't always have to be a certain key press for a certain event; it can happen by external control as well. The present invention could also be used with terminals that aren't in just one piece. The terminals could be ubiquitous in a sense that storage memory is outside the core device and perhaps has some other components as well. The present invention could be used with a virtual device, such as a "virtual camera" with all the components existing, but not all in the same "place".

The program memory 24 is connected to the controller 26. The program memory 24 comprises a memory having software programs stored therein. For example, the program memory 24 comprises the operating system software for the terminal 12. The mass memory 22 generally comprises a memory for storing user files. The user files can comprise data, image, video, voice, or any other suitable type of non-operating system electronic file which is input by a user into the terminal. The user can it input to the user files into the terminal 12 by the terminal's user interface, and input device on the terminal, or files downloaded into the terminal 12 by a communications link such as with use of the antenna 18, an electrical connector (not shown), or a wireless input device such as an infrared terminal (not shown).

The transceiver 20 and antenna 18 are adapted to communicate with the server 14 by means of the link 16. In the embodiment shown, the link 16 comprises a wireless link, such as a radio frequency link. The air interface standard may conform to, for example, a Time Division Multiple Access (TDMA) air interface, or a Code Division Multiple Access (CDMA) air interface, or a Frequency Division Multiple Access (FDMA) air interface, or GSM, or 3G. In alternate embodiments, features of the present invention could be used with any suitable type of air interface standard. In an alternate embodiment, features of the present invention could be used with a wired communications system, such as a land line telephone system. The wireless telecommunications system establishes the wireless link 16 to couple the terminal 12 to a base transceiver station (BTS) of an exemplary network operator 28.

The network operator 28 generally comprises a mobile switching center (MSC) for connecting to a telecommunications network, such as a public switched telephone network or PSTN, at least one base station controller (BSC), and a plurality of base transceiver stations (BTS) that transmit in a forward or downlink direction both physical and logical channels to the mobile station 12 in accordance with a predetermined air interface standard. A reverse or uplink communication path exists from the mobile station 12 to the network operator, and conveys mobile station originated access requests and traffic, such as voice and possible packet data traffic.

The network operator can include a Message Service Center (MSCT) that receives and forwards messages from the mobile station 12, such as Short Message Service (SAS) messages, or any wireless messaging technique including Email and supplementary data services. In an alternate embodiment, features of the present invention could be used with any suitable type of network operator system.

The mobile station 12 also contains a wireless section that includes a digital signal processor (DSP), or equivalent high-speed processor, as well as the wireless radio frequency (RF) transceiver 20 comprising a transmitter and a receiver. The transceiver is coupled to an antenna 18 for communication with the network operator 28. In an alternate embodiment, features of the present invention could be used with any suitable type of wireless communications device or mobile phone.

The communication protocol does not have to be wireless. These same algorithms could be used in a LAN-based computer system as well (although the individual parameters would then probably have to be adjusted). Thus, the present invention is not restricted to wireless terminals.

The server 14 could comprise any suitable type of computer server which is connected to the network operator 28 by any suitable means, such as a telephone line. The server 14 preferably comprises a memory 30 and a system 32 for transmitting files between the memory 30 and the network operator 28. In alternate embodiments, the server 14 could comprise any suitable type of components.

As illustrated in FIG. 1, a terminal and server can be coupled by a wireless interface. The terminal can have a fairly large internal mass memory. Bandwidth from the mass memory to the terminal can be very fast. There is a much larger memory on the server. The terminal can communicate with the server via at least one air interface (possibly several options are available). However, in all cases, the bandwidth is relatively slow, and typically it also has a cost to the user (i.e., costs associated with using a GSM network or 3G network). It is desired to optimize the terminal's memory so that it never gets too full, yet always contains the most relevant data for the user for quick access. Although the server could contain a copy of all the relevant data, a slow bandwidth or lack of network may make it impossible, or at least difficult to use it on demand.

The present invention shows how this can be done by prioritizing the files, with the prioritization based on several parameters; not just one parameter. The lowest-priority files can be removed with little or no negative effect on the user. Thus, it is almost always possible to make sure that there is sufficient space in the terminal for the user to store new files. On the other hand, this can be achieved with reasonably small memory capacities and, hence, low cost.

The present invention describes a way in which file prioritization can be done by a mobile terminal, mobile electronic apparatus, or other electronic device. This prioritization is done based on several parameters, such as: age parameter, space parameter, move penalty parameter and perhaps other parameters; for example, costs. Those parameters are defined automatically, but it is also possible to change these automatic parameters. The final choice of parameters and their weightings will depend on the system and choices made by the designer; the parameters and weights presented here are only indicative and optimized for the system shown in FIG. 1, with certain assumptions about the programs and files in the system. Based on the parameters, the file prioritization is done. The lowest prioritization file(s) can be suggested to be deleted/moved from the memory. The actual delete/move decision can be done by the user.

Mass memories in mobile terminals will always have very limited capacities. The present invention provides a useful way to add flexibility when the amount of memory in the terminal is moderately large, and larger amounts of data can be downloaded over the air to a remote server. In that case, the user can be warned well before the memory is filled. The terminal can additionally aid in suggesting to the user which files should be removed from the terminal (either permanently, or to a backup server). The algorithm can "prioritize" the files on the terminal according to the importance the user is likely to place on the file, and can offer to remove the files with the lowest priority.

Figure 2:
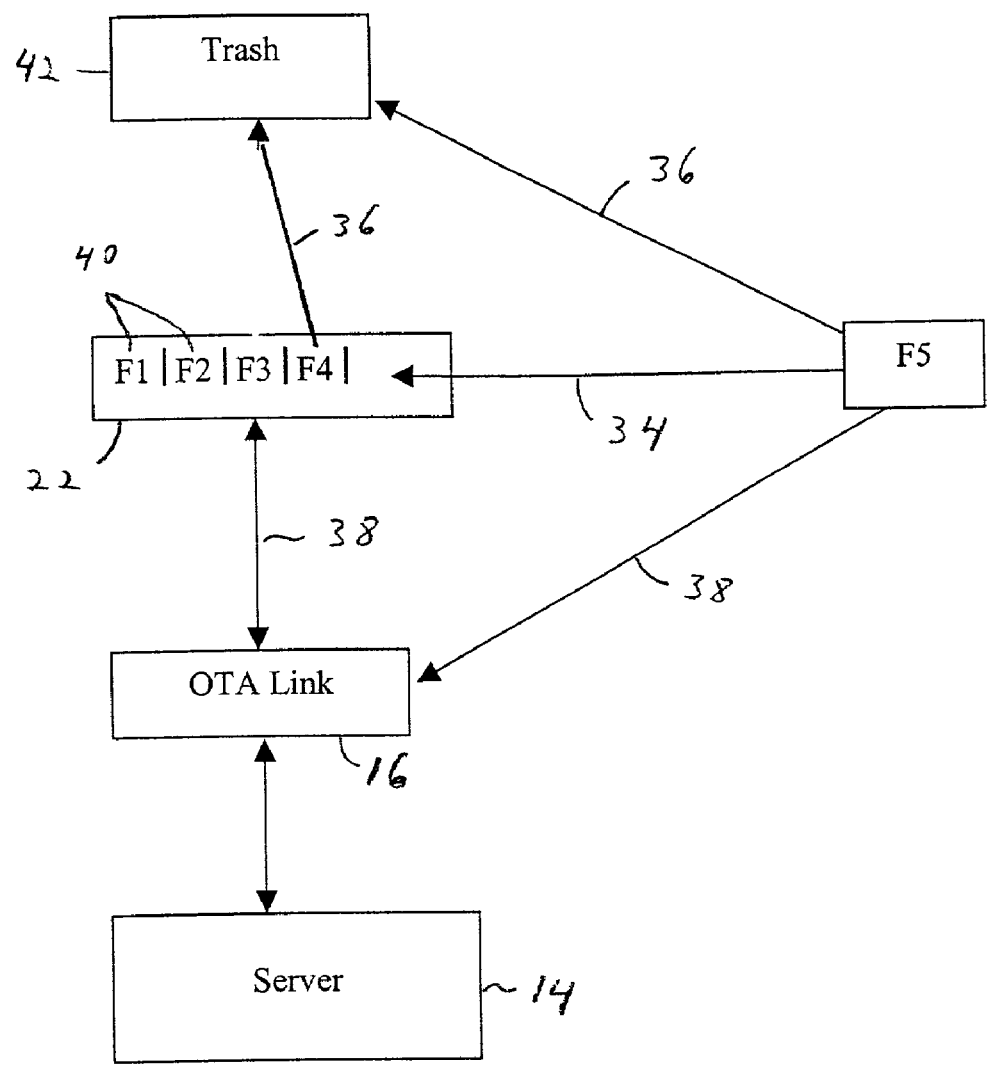
FIG. 2 is a block diagram illustrating four possible operations which can be performed in the system shown in FIG. 1.

Referring now also to FIG. 2, there is shown a diagram illustrating four possible operations which can be performed in the system 10. As seen in FIG. 2, the mass memory 22 comprises user input or stored files F1, F2, F3, F4 therein. As used herein the term "user input file" or "user stored file" means a file which is input and which is a non-operating system electronic file; for example, a data file, an image file, a music file, a video file, a voice or sound file, etc. FIG. 2 also illustrates another file F5 which has not been stored in the mass memory 22 yet. As seen in FIG. 2, for any given file, four operations are possible:

- 34 (Add): New file only, add to terminal.
- 36 (Delete): Delete the file
- 38 (Move): Move the file to the server via the air interface, delete from terminal
- 40 (No change): Do nothing.

The file F5 can be added 34 to the mass memory 22. The file F5 can be deleted 36 to the trash 42. The file F5 can be moved 38 to the over-the-air (OTA) link 16 to the server 14 where it can be stored. The files in the mass memory 22, as illustrated by files F1 and F2, can be provided with no change 40. The files in the mass memory 22, as illustrated by file F4, can be deleted 36 to the trash 42. The files in the mass memory 22, as illustrated by file F3, can be moved 38 via the over-the-air link 16 to the server 14. The link 16 is preferably a two-way link such that files can be transferred back and forth between the mass memory 22 and the server 14. However, in an alternate embodiment, the link 16 might comprise a one-way link. In addition, although the link 16 has been described as an over-the-air link, in an alternate embodiment the link 16 could comprise a wired like.

In determining what operations to do, the following should be considered:

- Adding a new file decreases the amount of free space left.
- Deleting a file removes the content and hence decreases the "information value" of the terminal.
- Moving a file takes time.
- Doing nothing (keeping the file in the terminal) achieves nothing.

For implementation of the present invention, a fundamental principle is that each file be assigned a "priority". The priority is defined as a function of certain parameters derived from the file information. The files can be sorted according to priority; the files with the lowest priorities are those that the terminal believes could be removed/backed-up/compressed with the least harm to the user.

In theory, a wide variety of methods and functions could be used to define the priority. Various fuzzy or neural learning methods could, for example, be used. However, in one embodiment the invention would be extremely simple to implement (in the best case, it could consist of a few lines of code). It is also quite robust and intuitively simple. In addition, it can mathematically be considered a "fuzzy" solution, since it can use values between 0 and 1. The most robust way to do the scaling would be to create dimensionless units with values between 0 and 1. It is then possible to weight the individual parameters, with the total priority (Pi) being a suitably weighted sum of the parameters. The files can then be ordered according to total priority (Pi). Some of the parameters could include a file age parameter, a file size parameter, a value judgment parameter, a cost parameter, a move penalty parameter, a user input override parameter, a file compressibility parameter, a size of free space in the memory parameter, a number of times a file has been accessed parameter, and a time decay parameter as a floating average. This list is only a partial list and additional parameters could be envisioned. In addition, not all of these parameters need be used. The following is a further description of some of these parameters that were used in the test indicated below.

Age Parameter

Typically, the need for a file decreases with the age of the file. An analysis has shown that in most cases, a user created or stored file that is more than one year old is unlikely to be needed in active use, and can be archived or destroyed. A suggested formalism for the "need probability" of a file is $$Vi \sim exp(-T/T0),$$

where T is the time from the last access and T0 is a "decay constant". Experience would suggest that T0~1 year, but other values may be realistic for specific applications. The actual value of T0 must thus be chosen case by case. Scaling to [0, 1] gives exactly the function:

$$Vi = exp(-T/T0).$$

Space Parameter

A file takes up space. If M is the total memory capacity, Li is the length or size of a file, and R is the amount of space left (R=M−sum(Li)), then the best parameter to use is the amount of free space (FS) remaining after a new file is added $$FS = R - Li.$$

Adding a new file decreases the amount of free space, and this becomes especially critical when the free space approaches zero. The value of free space (FS) could be scaled by a "comfort capacity" (CC), which is the amount of memory left that the user would feel "comfortable" with. For example, for a mobile telephone or communicator which an also store digital images (an imaging phone), this could be the amount of memory taken up by 20 images (thus, the user should at any point have the capacity to take 20 snapshots without worrying about memory or having to take any extra actions to free memory). Then (scaling to [0, 1]) a space parameter (Fi) can be determined such as:

$$Fi \sim FS/CC = 1 - CC/(R - Li).$$

In the general case (when the memory is nearly full), this must be evaluated explicitly for each file, after the files have already been sorted, requiring non-linear solving. When the memory is almost empty, R>>CC and R>>Li, then the expression can be approximated by $1-(CC/R)*(1+Li/R)$, which can be scaled easily to [0, 1]. However, this is not likely to occur in practical systems.

Move Penalty Parameter

Moving a file incurs a time penalty. The time (Ai) to move the file, based upon a constant bandwidth (BW), is simply $$Ai = Li/BW,$$

if there is only one air interface. In that case, the scaling can be done by ignoring the constant BW and dividing the sizes of the files by the size of the largest file on the terminal:

$$Ai = Li/\max(Li).$$

Override Parameters

An "override parameter" would also be highly useful, since any automatic system is inherently likely to eventually prioritize some files in a way that is not acceptable to the user. The override parameter could, in the simplest case, be from 0 to N (where N is an integer). If the user is unhappy with low priority placed on the file, he can increment the override parameter. This will automatically raise the priority of the file (but eventually lower it again through age decay). By allowing the override parameter to grow to an unrestricted size, the user can perform the override several times, without a need to store complex information about the time of first override, etc. Although more advanced schemes could be more flexible, this particular embodiment has the advantage of extreme simplicity.

Other Parameters

Additional parameters can be defined as needed. Cost is the most obvious choice. If there are copyright costs incurred by removing a file, then the file can be given a cost parameter Ci, scaled to Ci=Ci/max(Ci). An "emotional value" parameter" would be extremely useful. Any parameter is mathematically acceptable that can be scaled between 0 (no emotional value) and 1 (highest emotional value).

Sorting by Priority

Because of the way Fi has been defined, it depends on the order of the files (since the amount of space left (R) is, in fact, a function of location: Fij=1−CC/(Rj−Li), where j is the priority of the file. Thus, it will be necessary to recalculate and re-sort the parameters when the first prioritization has been made. Several iterations may have to be made before the final ordering is found. The system should stabilized after 3–4 iterations.

When a new file is to be added, its value Fi is estimated. It is added to the end of the list and the list is re-sorted. Several iterations may be necessary. The files with lower priority are scanned to see whether they should be moved or deleted. In this case, deletion or moving should certainly occur where Fi<0.

Practical Definition of the Parameters

The information mentioned here can, in most cases, be read directly from the file allocation system (possibly with the exception of the cost), and hence no changes to the file allocation table (FAT) are needed. If additional parameters are wanted, then it will be necessary to create a "shadow FAT" on which the values can be flagged. For example, a certain file could have great emotional content, and the user demands that it be stored at all costs. Also, since the remote server has memory, it should be possible to defined whether the file is moved to the server (effectively archived) or whether it can be used and deleted just on the terminal. Although good default values can be placed on these issues, it would acid flexibility if the user could flag the files himself at the moment of creation (or at a later date).

General Algorithm

The general algorithm for practicing the invention could merely comprise resorting existing files, adding a new file, and removing files. The following is an example, and should not be considered as limiting.

Resort existing files (if necessary):
1. Read data information.
2. Create dimensionless parameters with values from [0, 1].
3. Create the priority number as a weighted sum of the parameters.
4. Sort by priority number.
5. Re-evaluate the priority numbers if they can change (e.g. Fi).
6. Run steps 4–5 until priorities converge or a fixed number of runs has been performed.

Add new file (can be done for several files at the same time):
7. Create an initial priority number (Pi) for new file.
8. Add to end of list, sort by priority number.
9. Re-evaluate the priority numbers if they can change (e.g. Fi).
10. Run steps 8–9 until priorities converge or a fixed number of runs has been performed.

Remove files from end (optional):
11. Identify the files that should be removed.
12. Ask user if files should be removed and/or backed up, remove/backup.
13. (Optional) Re-sort the priority list.

Technical Implementation

It is possible to perform the algorithm each time the file system is accessed and form the priority list into a temp file, but it is suggested that a more preferable embodiment would have the list permanently in non-volatile memory to speed up the operation. The extra list only takes up a little bit of space. It needs to store the priority number, and a pointer to the file in the FAT.

The algorithm can be performed each time files are added, modified, or deleted. In this case, it may be advantageous not to perform the full sorting every time to preserve power. Rather, the priorities can be considered static, and new files simply added to the correct place in the sorted list. However, the full refreshing of the sorted list should be done occasionally.

The most preferred embodiment could perform the full algorithm only during particularly advantageous times, for example when the terminal is being charged (in which case the power taken up by the extra file handling is not a problem). In this case, it would be advantageous to perform both the prioritization and de-fragmentation (or other memory-control) operation at the same time. Alternatively, the prioritization can be performed at specified intervals. The optimal solution will depend on the application and the type of file access it uses. The present invention could be implemented in any electronic product utilizing large amounts of data, including media phones or imaging phones. Memory-heavy applications such as the Media Diary™ (NRC) could be implemented much more quickly if the terminals were to have this type of capability. The full capacity needed will probably never be reached in phones, but a local mass memory could add a layer to which intermediate results are stored.

The present invention can be most easily implemented by making the file-control program a separate program running on top of the operating system, auto-loaded either when new files are added, at pre-defined intervals, or manually by the user. A more efficient method might be to implement this as part of the operating system.

The invention can also be used in automatic mode to provide backups to an over-the-air (OTA) server or personal computer (PC) when access is available. The invention can also be used in a "reverse mode" for use with highest-priority files. In this reverse mode, the system can make an extra copy of a file and store it on the remote OTA server while still keeping it on the mobile terminal. In other words, it can provide a flexible and simple way to make automatic backups of the highest-priority files.

The invention can also be used in digital cameras (or camera-equipped CMT's). The invention can enable that there is always sufficient memory to take at least one more picture. For a digital camera, which does not have an ability for a wireless link, automatic prioritization of the files can allow the lowest-priority images to be compressed or deleted.

The simplest implementation of the present invention could be extremely minimalist; just a few lines of code and a list of pointers and numbers. If space is the primary issue, the list can even be generated at run-time only, so that when off-line, the program takes up almost no space.

The invention can be implemented with the standard file management commands that already exist, even in the rudimentary Windows file system (see the test case). No operating system level changes are needed. (Although such changes could make the system more flexible).

If wanted, the system can be made quite invisible and automated (although this is probably not an embodiment to be preferred). On the other hand, the user can be given extreme control over the system if so desired. Thus, a high degree of personalization is possible by suitable choice of the parameters and adjustment of the weights.

If implemented well, the system can be used to minimize fragmentation. The files can be physically arranged in the memory by priority, so that changes are most likely to occur at the edges of the memory area. To be effective, this de-fragmentation should be performed regularly. However, it is no way necessary to have this de-fragmenting capability. The invention can be run entirely on top of the operating system (OS) file system, without caring about the physical memory implementation.

In a rudimentary application of the present invention, an individual user may well have use patterns that confound this system. The best way to avoid this would be to implement an additional learning layer that can assign higher information values to specific files or file types.

The program will take up some space, and running it will take up operating power and time (particularly if the data needs to be sorted frequently). It is possible to implement an extremely minimalist version, but even so, the intelligence takes up some capacity. The recommended embodiment would be to have the terminal regularly evaluate its file priorities during times of low usage.

Psychologically, many users might at first be uncomfortable with the idea of a "smart" file system that tries to predict what they will want. The invention is preferably implemented very carefully so that this does not happen. It is preferred that it be clear to the user that this invention is simply a help-tool, and does not control the user.

It is an important desire to implement the file-control program so that the user remains in final control of it. The moving of data from terminal to server should probably not be automatic. Rather, the user should be asked first and allowed to choose which files he moves (if any). The user can preferably also be able to turn OFF the file-control program Test A test case with actual data was run to demonstrate the feasibility of the system (at a somewhat subjective level). All of the *.doc files of a user's computer over two years were listed (including both work and leisure documents). The document information was imported into Excel™.

The format below was used. NN is a unique identifier for the document. The documents were sorted by last modify date. In effect this gives the age of the document. The run was made on 20.11.2001; in that column, the date of last modification is listed. The columns x,y,z,w contain director information in a format that was found too clumsy for actual use. The last two columns show the directory data that was used in the demonstrator: The number of days from 20.11.2001 since the file was last modified, and the size of the file in Kbytes.

In table 1, six of the files are shown. The ARCH and TERM columns document the subjective importance assigned manually by the user to each file. ARCH has a value of 10 if the user felt that the file should be archived somewhere, 0 if not. TERM is a measure of the importance which the user places on terminal access to the file. The measure is subjective, but the following definitions were used:

0: The user does not care if the file is on the terminal.
1: The user would prefer to have the file on the terminal, but will not mind if it is removed.
2: The user wants the file on the terminal, but will be willing to have this file removed if something has to be removed.
3: The user's work/leisure will be affected if the file is not on the terminal, but he could accept removal.
4: The user MUST have the file on the terminal.

TABLE 1

| ARCH | TERM | NN | NAME | 20.11.2001 | x | y | z | w | DAYS | SIZE |
|---|---|---|---|---|---|---|---|---|---|---|
| 10 | 1 | 1 | MSL_periaate.doc | 06.12.1996 | # | # | # | | 1810 | 11 |
| 10 | 2 | 2 | MS-Avain.doc | 25.01.1997 | # | # | # | | 1760 | 29 |
| 10 | 2 | 3 | Sitoumus.doc | 14.03.1997 | # | # | # | | 1712 | 13 |
| 10 | 2 | 4 | Potleht.doc | 15.07.1997 | # | # | # | | 1589 | 14 |
| 10 | 2 | 5 | potanomu.doc | 30.10.1997 | # | # | # | | 1482 | 15 |
| 10 | 0 | 6 | Aaniloma.doc | 12.04.1998 | # | # | # | | 1318 | 12 |

Figure 3:
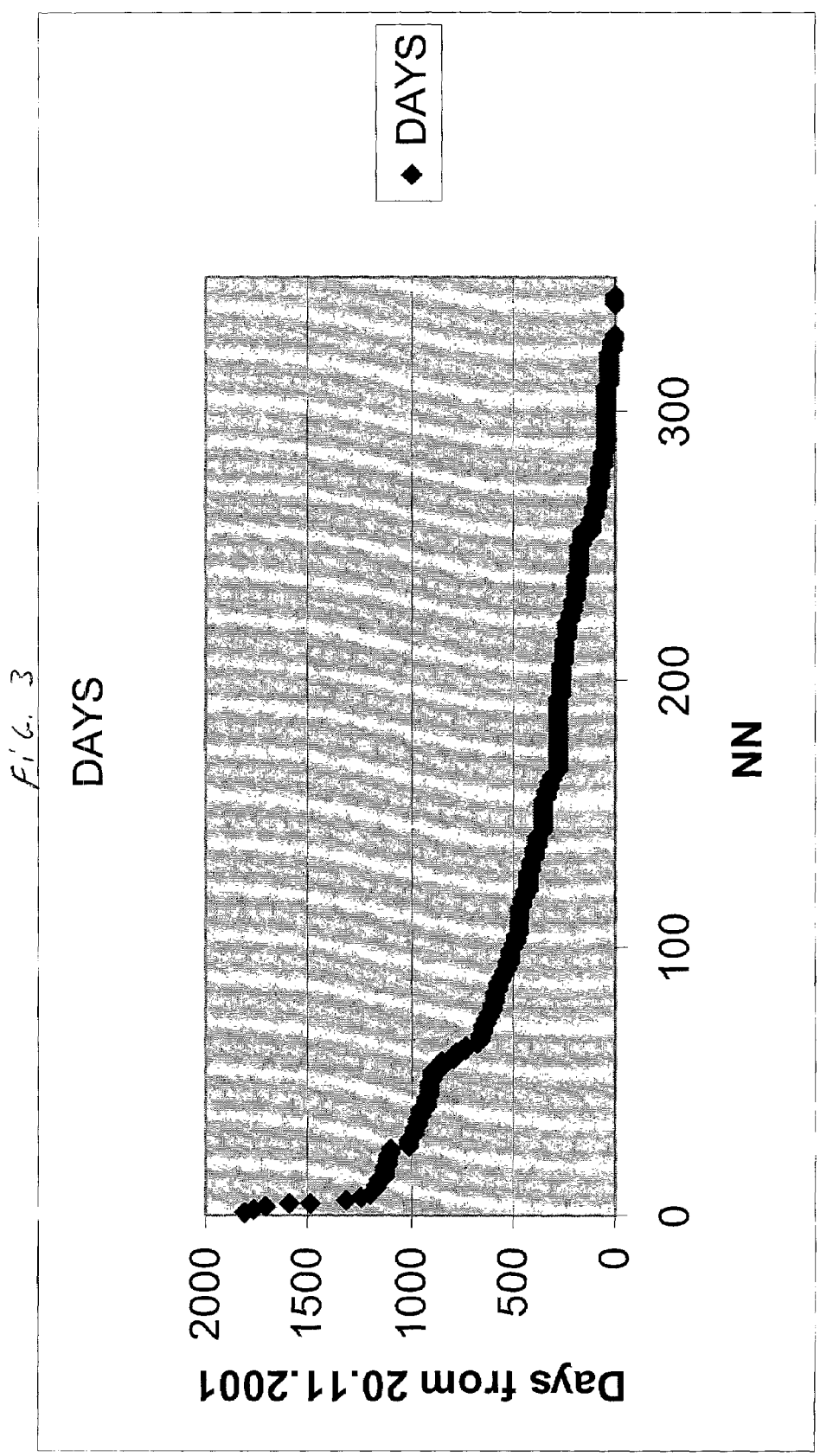
FIG. 3 is a chart of age of files in a test of the present invention.
Figure 4:
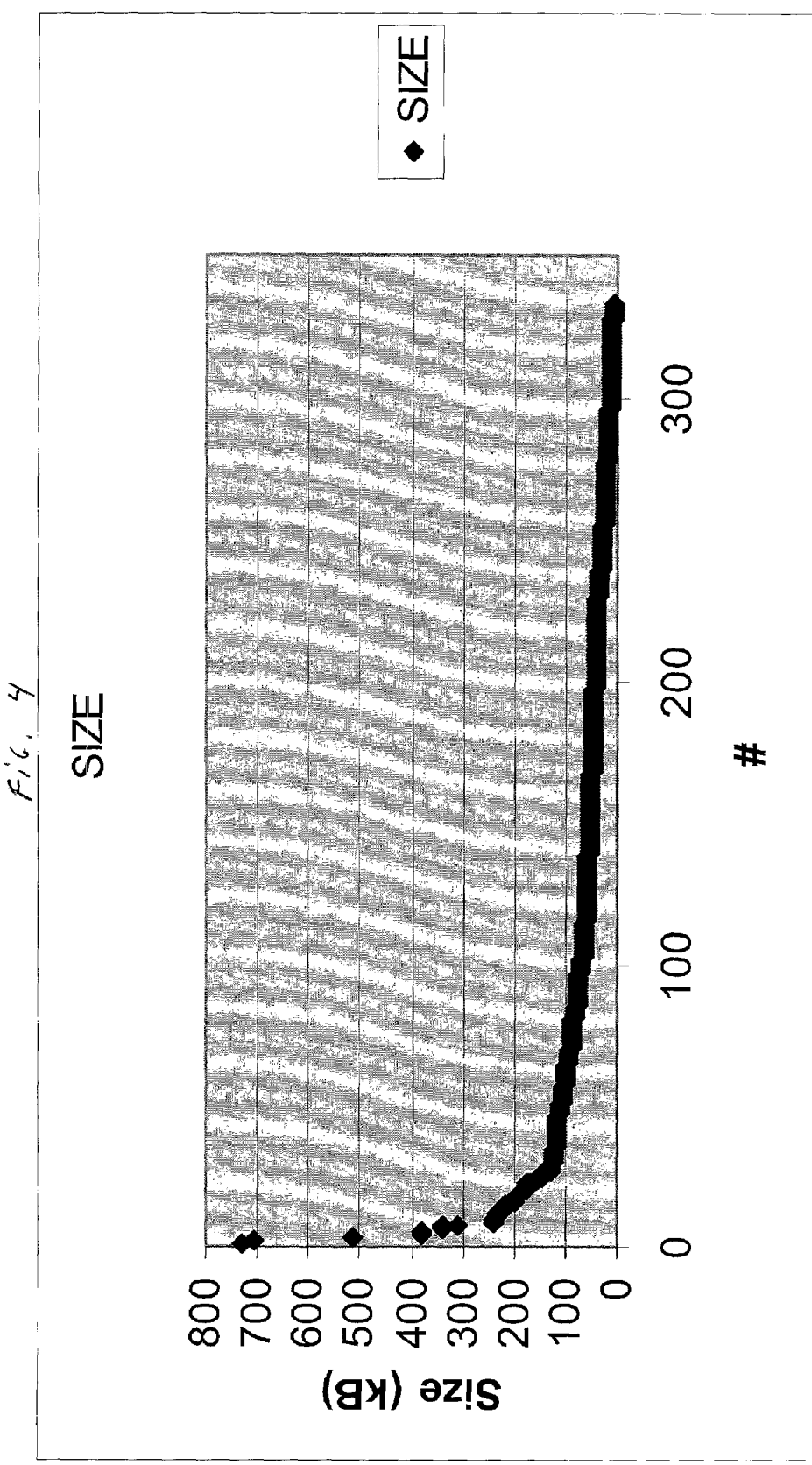
FIG. 4 is a chart of file sizes of the files used in the test.
Figure 5:
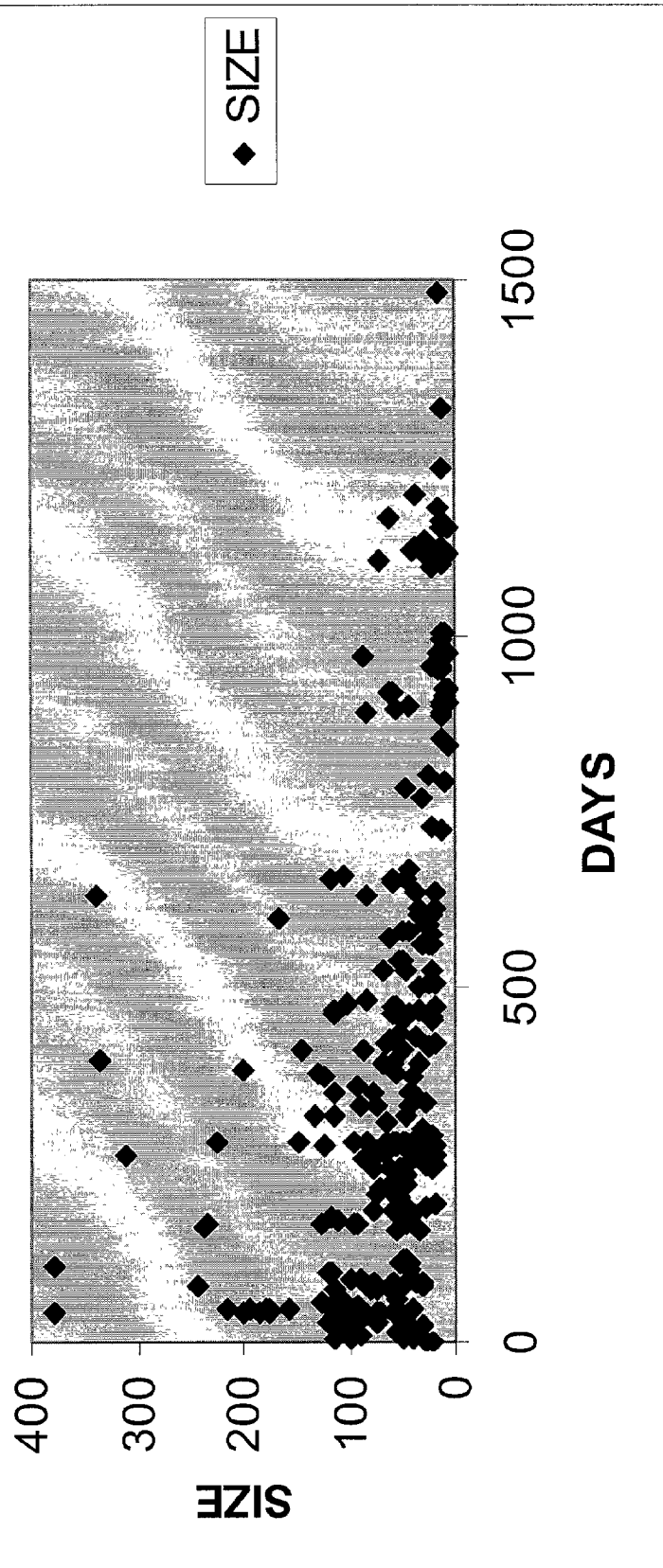
FIG. 5 is a chart showing an absence of correlation between age of the files and size the files used in the test.

The test set contained 343 files. The DAYS distribution is shown FIG. 3. The SIZE distribution is shown in FIG. 4. The DAYS-SIZE distribution (with outliers removed) is shown in FIG. 5. There is no clear correlation, although the older files tend to be smaller (due partly to a software update in 2000, which grew the sizes of the data files). This correlation may have a small effect on the results, but does not skew them unacceptably. ARCH was 10 in 264 of the files, 0 in 79, with no correlation with age or size.

Figure 6:
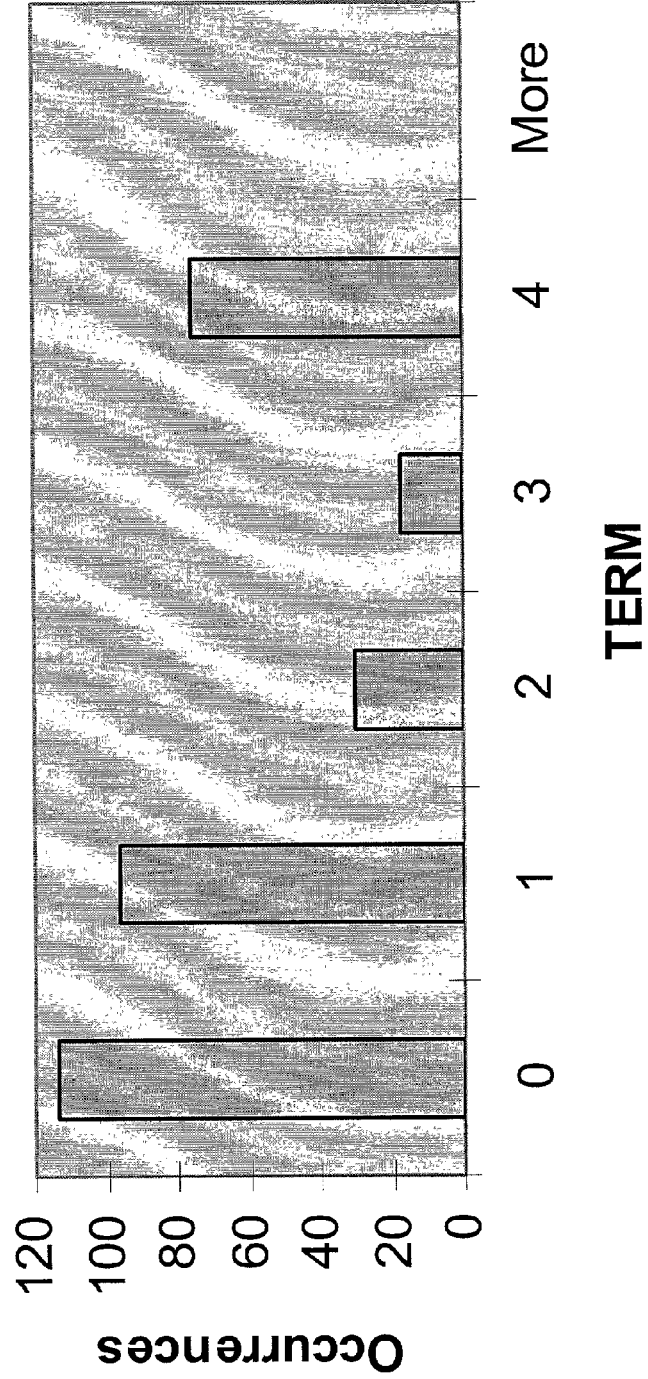
FIG. 6 is a chart of a TERM distribution of files used in the test.

The TERM distribution is shown in FIG. 6. The distribution is clearly skewed towards the edges; this may be due to the test user's psychology, or to a more general difficulty in assigning intermediate values meaningfully.

Figure 7:
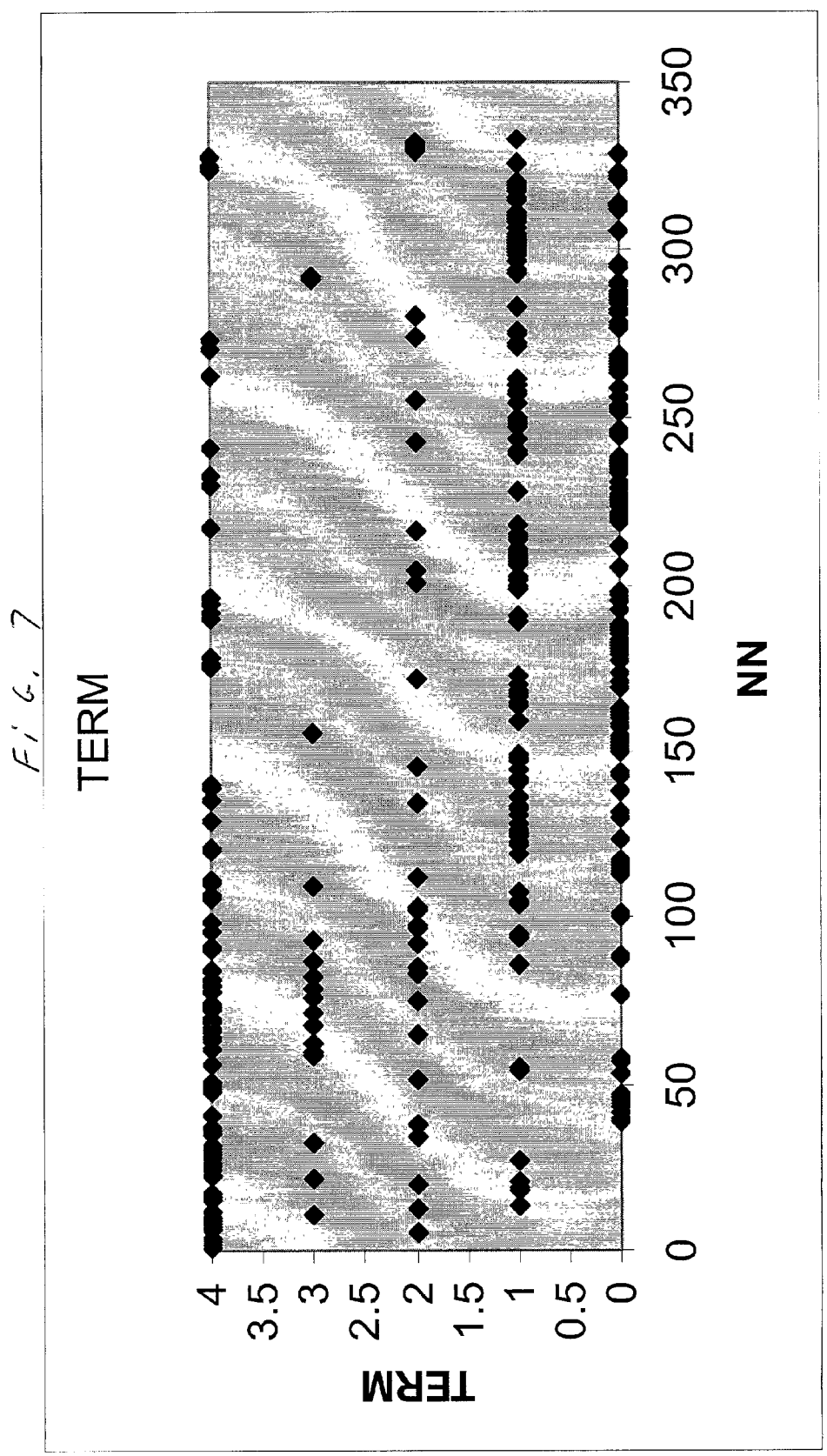
FIG. 7 is a chart which correlates TERM with time for the files used in the test.

The correlation of TERM with time is shown in FIG. 7. There is some correlation, with TERM values generally falling with age (supporting the "value-decay" hypothesis).

All files to the right of this line would have to be deleted. All files to be deleted have TERM value≦2, which means that these deletions would be acceptable to the user. All files to be deleted have lengths below 100 kB, meaning that upload times back from the server would be reasonable. Nearly all files to be deleted are at least a year old. This suggests that a "half-life" of one year might well be a reasonable value.

A more advanced simulation was performed on a subset of the same data. A few files were removed to make the numerical analysis more intuitive. The capacity M was set at 25,000 Kb; the "comfort capacity" was set at 1,000 Kb. In other words, when the capacity rises above 24 MB, the system should ask the user to remove some of the files, even though there may still be capacity. Table 3 shows some of the data.

TABLE 3

| ARCH | TERM | NN | NAME | DATE | x | y | z | w | DAYS | SIZE | # | Vi | Li | Fi | NEW | SUM | SL | R |
|---|---|---|---|---|---|---|---|---|---|---|---|---|---|---|---|---|---|---|
| 10 | 4 | 261 | Disk.. | 06.08.2001 | # | # | # | | 106 | 379 | 1 | 0.74 | 0.52 | 0.96 | | 0.74 | 379 | 24621 |
| 0 | 0 | 47 | Jas | 29.05.1999 | # 6 | # | | | 906 | 6 | 321 | 0.08 | 0.01 | 0.16 | | 0.08 | 23811 | 1189 |
| 10 | 0 | 44 | A_ | 18.05.1999 | # # | # | | | 917 | 10 | 322 | 0.08 | 0.01 | 0.15 | | 0.08 | 23821 | 1179 |
| 10 | 0 | 38 | Aan_ | 13.04.1999 | # # | # | | | 952 | 16 | 323 | 0.07 | 0.02 | 0.14 | | 0.08 | 23837 | 1163 |
| | 5 | 324 | XX1 | 20.11.2001 | # # | # | | | 0 | 30 | 324 | 1.00 | 0.04 | 0.12 | 1.05 | 0.39 | 23867 | 1133 |
| | 5 | 325 | XX2 | 20.11.2001 | # # | # | | | 0 | 97 | 325 | 1.00 | 0.13 | 0.03 | 1.05 | 0.39 | 23964 | 1036 |
| | 5 | 326 | XX3 | 20.11.2001 | # # | # | | | 0 | 65 | 326 | 1.00 | 0.09 | −0.03 | 1.05 | 0.35 | 24029 | 971 |

The cumulative size of all the files in the sample was slightly over 23 MB. To illustrate the basic principle, it was decided that the "terminal" should have a capacity of 20 MB. Thus, the method must be able to remove at least 3 MB worth of files in a way that is acceptable to the user.

To illustrate the basic principles, the values were scaled between 0 and 100, so that they could be more easily compared. The column with "0" is a secondary numbering system, for plotting purposes.

K_DY=100*(1−DAYS/Max(DAYS)), so that K_DY is largest for the newest files. Max(DAYS)=1810.
K_SZ=100*SIZE/Max(SIZE); Max(Size)=729 kB
K_TR=25*TERM
K_SUM=K_DY+K_SZ+K_TR
CUMSIZE=cumulative size of files in Kb, divided by 20 MB. This value goes above 100, meaning that the capacity is filled.
Table 2 illustrates the data for three of the files.

Vi is the value calculated from exp(−DAYS/365).
Li is the length of the file, scaled by the length of the largest file.
Fi=1−1000/(R−SIZE), 1000 is the comfort capacity.
NEW is a flag for plotting, whose value is 1.05 for added files
SUM=(Vi+Li+Fi)/3
SL=cumulative sum of the files
R=space remaining if total capacity is 25000.

Figure 9:
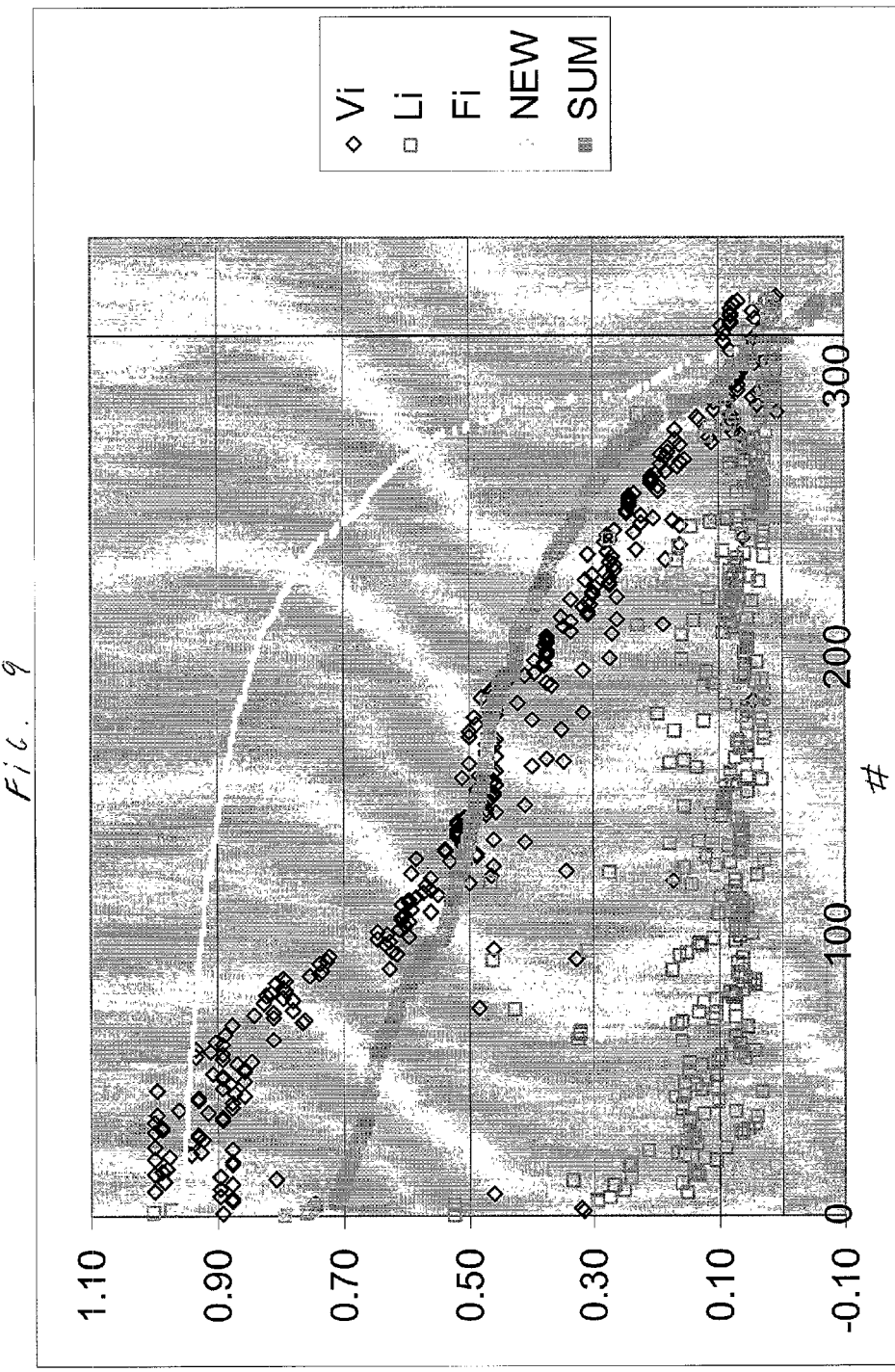
FIG. 9 is a chart of various parameters associated with the files used in the test and the location of a cutoff determined by the test system.

It can be immediately noted that for the third added file, XX3, the value Fi becomes negative because the comfort level is attained. A total of six new files were added. Because of the way the Excel™ sheet was set up, several iterations had to be performed before the files found the correct order. The result is shown in FIG. 9. The new files are marked with crosses; they are all near the top of the priority list because of their newness.

TABLE 2

| ARCH | TERM | NN | NAME | DATE | x | y | z | w | DAYS | SIZE | 0 | K_DY | K_SZ | K_TR | K_SUM | CUMSIZE |
|---|---|---|---|---|---|---|---|---|---|---|---|---|---|---|---|---|
| 10 | 4 | 261 | Dis... | 06.08.2001 | # | # | # | | 106 | 379 | 1 | 94 | 52 | 100 | 82 | 2 |
| 10 | 3 | 174 | de.... | 12.02.2001 | # | # | 0 | | 281 | 512 | 2 | 84 | 70 | 75 | 77 | 4 |
| 10 | 4 | 272 | Tes.... | 04.09.2001 | # | # | # | | 77 | 242 | 3 | 96 | 33 | 100 | 76 | 6 |

Figure 8:
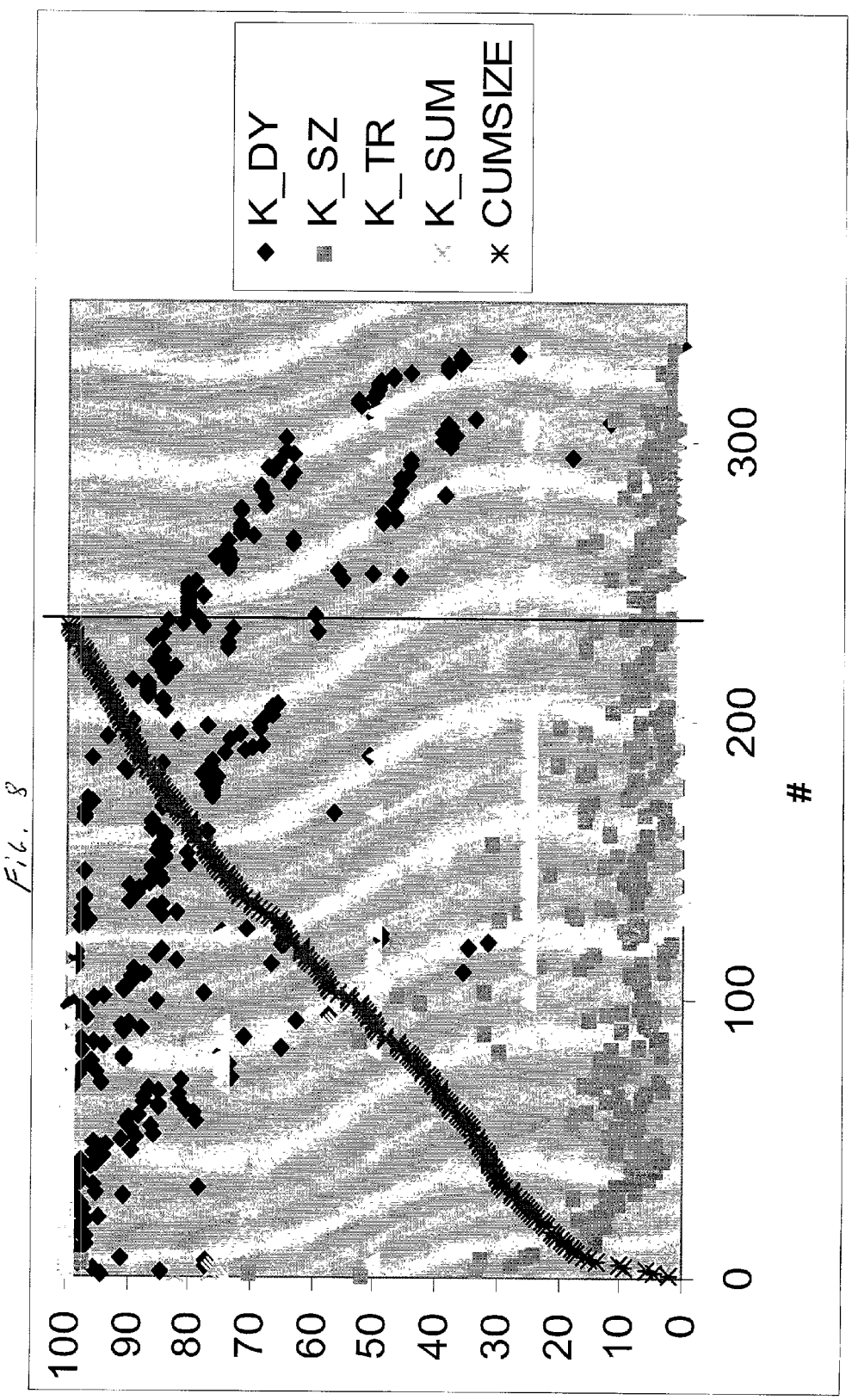
FIG. 8 is a chart correlating values of the files used in the test.

All the relevant parameters are plotted in FIG. 8; sorted by K_SUM. Several facts can be seen. There is strong correlation between the parameters K_DY,K_SZ,K_TR. The limit CUMSIZE=100 has been marked with a vertical line.

The location where the SUM and Fi go negative is shown below in table 4. In this case, Fi is the parameter that should be followed; thus, all files starting from NN17 should be deleted (a total of 18 files).

TABLE 4

| ARCH | TERM | NN | NAME | DATE | X | Y | Z | W | DAYS | SIZE | # | Vi | Li | Fi | NEW | SUM | SL | R |
|---|---|---|---|---|---|---|---|---|---|---|---|---|---|---|---|---|---|---|
| 10 | 1 | 27 | Tyo | 22.02.1999 | # | # | # | | 1002 | 10 | 309 | 0.06 | 0.01 | 0.06 | | 0.05 | 23933 | 1067 |
| 0 | 0 | 48 | Jm_jsk | 03.06.1999 | # | # | # | | 901 | 44 | 310 | 0.08 | 0.06 | 0.02 | | 0.05 | 23977 | 1023 |
| 10 | 1 | 14 | Iso_pu | 12.10.1998 | # | # | # | | 1135 | 27 | 311 | 0.04 | 0.04 | 0.00 | | 0.03 | 24004 | 996 |
| 10 | 1 | 17 | Kalvo | 26.10.1998 | # | # | # | | 1121 | 19 | 312 | 0.04 | 0.03 | −0.02 | | 0.02 | 24023 | 977 |
| 0 | 0 | 55 | Julkise | 20.07.1999 | # | # | # | | 854 | 13 | 313 | 0.09 | 0.02 | −0.04 | | 0.02 | 24036 | 964 |
| 10 | 1 | 24 | pl4. | 15.11.1998 | # | # | # | | 1101 | 11 | 314 | 0.05 | 0.02 | −0.05 | | 0.00 | 24047 | 953 |
| 10 | 2 | 5 | pota | 30.10.1997 | # | # | # | | 1482 | 15 | 315 | 0.02 | 0.02 | −0.07 | | −0.01 | 24062 | 938 |
| 0 | 0 | 56 | Juok | 21.07.1999 | # | # | # | | 853 | 12 | 316 | 0.09 | 0.02 | −0.08 | | 0.01 | 24074 | 926 |
| 10 | 1 | 8 | Lisale | 11.08.1998 | # | # | # | | 1197 | 38 | 317 | 0.04 | 0.05 | −0.13 | | −0.01 | 24112 | 888 |

The 17 files to be scanned were checked by the user, and it was subjectively agreed that these files could be removed, given the circumstances. With this test, the basic principle was shown to work.

Emotional Valve

The present invention can also present a realistic implementation for categorization of images or other data by "emotional value". The implementation is simple and intuitive to the user, while enabling a powerful new way of classifying and prioritizing images. The implementation shown here is optimized for image files, but there is no fundamental reason why it could not be used for other types of files as well.

Figure 10:
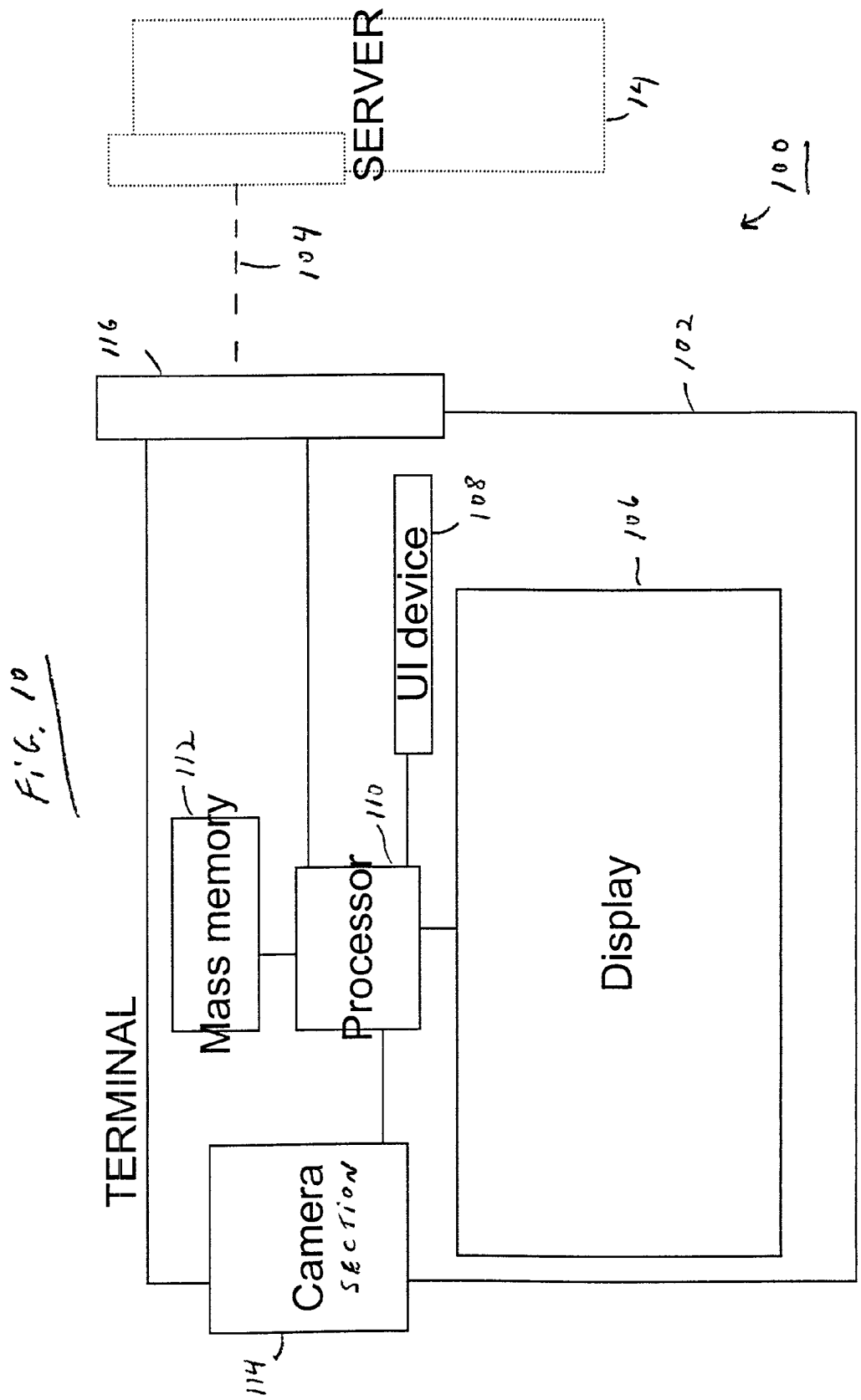
FIG. 10 is a block diagram of an alternate embodiment of the present invention.

Referring now also to FIG. 10, there shown a block diagram of an alternate embodiment of a system 100 incorporating features of the present invention. In this embodiment, the system 100 generally comprises the server 14, a link 104 and a terminal 102. The terminal 102, in the embodiment shown, generally comprises a digital camera or digicam. However, in alternate embodiments, the terminal 102 could comprise any suitable type of device for storing digital images, such as a mobile telephone having image display or image capturing capabilities.

In the embodiment shown, the digital camera 102 to comprises a display 106 a user interface device 108, a processor or controller 110, a mass memory 112, an image capturing device or camera section 114 and a communications device 116. The invention can consist of the digital camera having an intermediate memory that can contain at least one image file, the larger non-volatile mass memory 112 (such as fitting at least 30 images), an image handling system (preferably graphical), the display 106 for previewing the images, and the processor 110. Optionally, it may also contain a wireless or wire-based link to a remote mass memory system. (3 G/GSM/Bluetooth to PC/remote server).

In one particular embodiment, the user interface 108 comprises a touch screen, moving slider, joystick, or other manually operated device, which enables the user to enter quick value judgments regarding images by using small motions of the fingers. The communications device 116 could comprise an electrical connector, an infrared communications port, or a wireless radio frequency communications device. The communications device 116 is adapted to be selectively connected to the server 14 by the link 104. The link 104 could comprise a wire or cable, such as a USB cable, when the server 14 is merely a personal computer and the communications device 116 is merely at the electrical connector.

The camera section 114 is adapted to digitally capture an image. The digitally captured image can be stored as files in the mass memory 112 by the processor 110. The user can use the user interface device 108 to display the image on the display screen 106. The user can also use the user interface device 108 to transfer or transmit files corresponding to the digital images from the communication device 116 to the server 14. The communications device 116 to also be used to transmit files corresponding to digital images from the server 14 into the terminal 102.

There is a desire that digital cameras be adapted to allow at least one more shot to always be taken. This invention makes that requirement almost realistic by prioritizing the images in the mass memory, with the prioritization based on several parameters. The lowest-priority files can be either compressed, moved over-the-air (OTA) to a remote server or PC, or deleted, with little or no negative effect for the user. Thus, it is almost always possible to make sure that there is sufficient space in the terminal for the user to take new images.

The requirement that there is "always sufficient memory to take at least one more picture" is obviously impossible to fill completely, but it is a rule of thumb that is being used by some manufacturers. The trivial way to solve it is to use more memory. However, this is expensive and does not really solve the problem since the additional memory will always be eventually filled. Another way is to move the images quickly over-the-air (OTA) to a remote server. However, this is not always possible, nor is it necessarily desired by the user. A third alternative is to force the user to delete or compress some of the files. This can be irritating if the user needs to take the picture quickly. The present invention combines the advantages of all these possibilities, and allows them to be used flexibly.

Most digital cameras have no real memory management at all. The prior art basically leaves all prioritization decisions to be done by the user. The present invention is a very clear improvement over that. Automatic or semi-automatic prioritization of the files means that the lowest-priority images can be compressed or deleted. If this is done automatically or semi-automatically, it is less frustrating to the user. The prioritization allows very tight optimization of the available memory. The "emotional value" parameterization is a novel feature that can enhance the usability of a product considerably, if implemented well.

Prioritization and, in particular, the "emotional value" parameter is a partial solution to the problem of data glut. Data glut is becoming a problem with digital imaging. If the user is allowed/forced to make an emotional evaluation of the image very soon after making it, he may be more willing to delete the poorest-quality images. Without this type of prioritization, if all the images are simply transferred over-the-air (OTA), the problem is only transferred to the server end. At some point the user must make value judgments over which pictures to keep. By making the first judgment immediately, or very soon, after taking the image, the later task can be made easier.

If the new parameters are also passed to the backup server, they can give the user a sense of how he felt about the image when taking it (or shortly after taking it). This can be a significant help later, when the images must be pruned and some discarded. Additional text, dictation clips, etc. may also be very useful in this respect. This is specifically a long-term advantage which is not immediately apparent when the user takes the picture, but which will be appreciated later. Thus, this feature will add to the long-term user satisfaction in a way which existing digital cameras simply do not.

Age Parameter

The age parameter mentioned above with regard to FIGS. 1–9 will not be very relevant in the digital camera embodiment, since the "decay parameter" will vary from user to user. For one user the camera could be used daily, but for another user it might be used sporadically and in a non-regular pattern. It is best to use a learning algorithm that learns the behavior of the user over time. The age parameter leads to the assumption that the number of images N of age T is given by:

$$N(T)=N0exp(-T/T0)$$

In this case, T0 can only be defined empirically by looking at the ages of the files when they are deleted or moved. On the other hand, it is desirable to calculate the decay parameter as a floating average so that changing user patterns can be accommodated. When the camera is first turned on, a queue of integers could be initialized. Whenever a file is deleted or moved over-the-air (OTA), its age (in days) could be added to the end of the queue. The queue preferably has a maximum length of approximately 100, but any suitable length could be provided. When the queue is first filled, a standard least-squares fit can be performed (bin the data; take logarithms; apply a least-squares fit) to estimate T0. To create the floating calculation, new values could be added to the end of the queue and the oldest ones deleted. The least-squares fit should be re-performed occasionally, but preferably not after every shot. A recommended embodiment would perform it when the camera is being recharged.

Space Parameter

This would preferably be the main parameter in this digital camera embodiment. A file takes up space. As noted above with regard to the first embodiment, if the total memory capacity is M, and R is the amount of space left (R=M−sum(Li)), then the best parameter to use is the amount of free space (FS) remaining after a new file is added:

$$FS=R-Li.$$

Adding a new file decreases the amount of free space. This becomes especially critical when the free space approaches zero. The value could be scaled by a "comfort capacity" CC, which is the amount of memory left that the user would feel "comfortable" with. For example, for an imaging phone, this could be the amount of memory taken up by 20 images (thus, the user can take 20 snapshots without worrying about memory). Then (scaling to [0, 1]) a space parameter (Fi) can be determined such as:

$$Fi \sim FS/CC=1-CC/(R-Li).$$

In the general case (when the memory is nearly full), this must be evaluated explicitly for each file, after the files have already been sorted, requiring non-linear solving. When the memory is almost empty, R>>CC and R>>Li, and the expression can be approximated by 1−(CC/R)*(1+Li/R), which can be scaled easily to [0, 1]. However, this is not likely to occur in practical systems.

Move Penalty Parameter

Moving a file incurs a time penalty. As noted above with regard to the first embodiment, if there is only one air interface, the time to move the file is simply $$Ai=Li/BW.$$

In that case, the scaling can be done by ignoring the constant bandwidth (BW) and dividing the lengths of the files by the size of the largest file on the terminal:

$$Ai=Li/\max(Li).$$

Compressibility Parameter

Although space can be saved by lossy compression, this is not always satisfactory. It results in degraded quality. Thus, one should avoid compressing files that have already be compressed. This parameter can be defined simply:

Ci=ratio by which file has already been compressed.

A non-compressed file could have Ci=1.

Emotional Value Parameter

An "emotional value" parameter is extremely difficult to estimate in this case, because of the rapid nature of imaging. When choosing images for a photo album, it will be possible for the user to look at the images closely and choose the best ones. During a shooting spree, this is not feasible, especially if the display is small. The best implementation would allow the user to give the images "stars" S, such as from one to five for example, and define the emotional parameter (Ei) as $$Ei=0.5+S/2.$$

This way, the emotional value parameter does not carry too much weight, since it is by nature a somewhat arbitrary parameter and the user may well give conflicting values if asked repeatedly. It is better to use the override parameter (see below) to enable the user to prioritize his files. In alternate embodiments, the emotional parameter could be determined by any suitable type of formula or lookup table and/or user input.

It should also be possible for the user to re-evaluate the emotional value of an image at any point in time, even after it has been backed up. This may potentially result in synchronization problems with the image on the server if the emotional value parameter is also passed in backup. However, this synchronization problem can be resolved if the image is backed up again. The user can simply be asked whether the terminal or the server value is allowed to override the other one. It is preferred that the user interface (UI) be chosen so that this emotional value judgment can be made simply and intuitively.

Quality Parameter

Although a computer system can never make a good judgment on the "quality" of an image, some simple measures of quality are possible. For example, under- or over-exposure results in almost identical values for all the pixels. Various modulation transfer functions (MTFs) could also be used to estimate blurriness. Since these systems are inherently untrustworthy, the default should be Qi=1. If the terminal judges the image to be obviously flawed, it can set the Qi to a lower value, but the minimum preferably is not much below 0.5 (so that this parameter does not weigh too heavily). In alternate embodiments, any suitable type of quality parameter or means for determining or inputting a quality parameter could be provided. Alternatively, the ability to input or determine a quality parameter might not be provided.

Override Parameter

An "override parameter" would also be highly useful, since any automatic system is inherently likely to eventually prioritize some files in a way that is not acceptable to the user. The override parameter could, in the simplest case, be from 0 to N (where N is an integer). If the user is unhappy with low priority placed on the file, he can increment the override parameter. This will automatically raise the priority of the file (but eventually lower it again through age decay). By allowing the override parameter to grow to an unrestricted size, the user can perform the override several times, without a need to store complex information about the time of first override, etc. Although more advanced schemes could be more flexible, this particular embodiment has the advantage of extreme simplicity. In alternate embodiments, any suitable means for inputting and override parameter could be provided. Alternatively, the ability to input and override parameter might not be provided.

Backup Flag

If the user is certain that he wants the image to be backed up on the PC or OTA, a flag could be set. This parameter should not be included in the summation below. It is preferably be a two-bit parameter:

0: Flag has not been set at all
1: Flag has been set, user does not need backup
2: Flag has been set, user wants a backup, backup has not been made.
3: Flag has been set, user wants a backup, backup has been made.

When the value is 1 or 3, the file can be deleted if its priority is low. If it is 2, it must not be deleted before it has been backed up. If it is 0, the user must preferably verify whether he wants a backup before it is deleted. In alternate embodiments, any suitable system for flagging a backup or making a backup could be provided. Alternatively, a system for flagging a backup might not be provided.

Sorting by Priority

Because of the way the space parameter Fi has been defined, it depends on the order of the files (since R is, in fact, a function of location: $Fij=1-CC/(Rj-Li)$, where j is the priority of the file. Thus, it will be necessary to recalculate and re-sort the parameters when the first prioritization has been made. Several iterations may have to be made before the final ordering is found.

When a new file is to be added, its value Pi is estimated. It is added to the end of the list and the list is re-sorted. Several iterations may be necessary. The files with lower priority are scanned to see whether they should be backed up, moved, compressed, or deleted.

Passing of Parameters to Backup

Not all of the parameters will be relevant on the server, but in a preferred embodiment the emotional value parameter should be passed at a minimum. The override parameter and backup flag can also give significant clues to how the user felt about the image at the time he took it, and should be passed. The compressibility and quality parameter may or may not be relevant. In an alternate embodiment, any suitable system for passing of parameters to a backup system could be provided. Alternatively, passing of parameters to a backup system might not be provided.

General Algorithm

Figure 11:
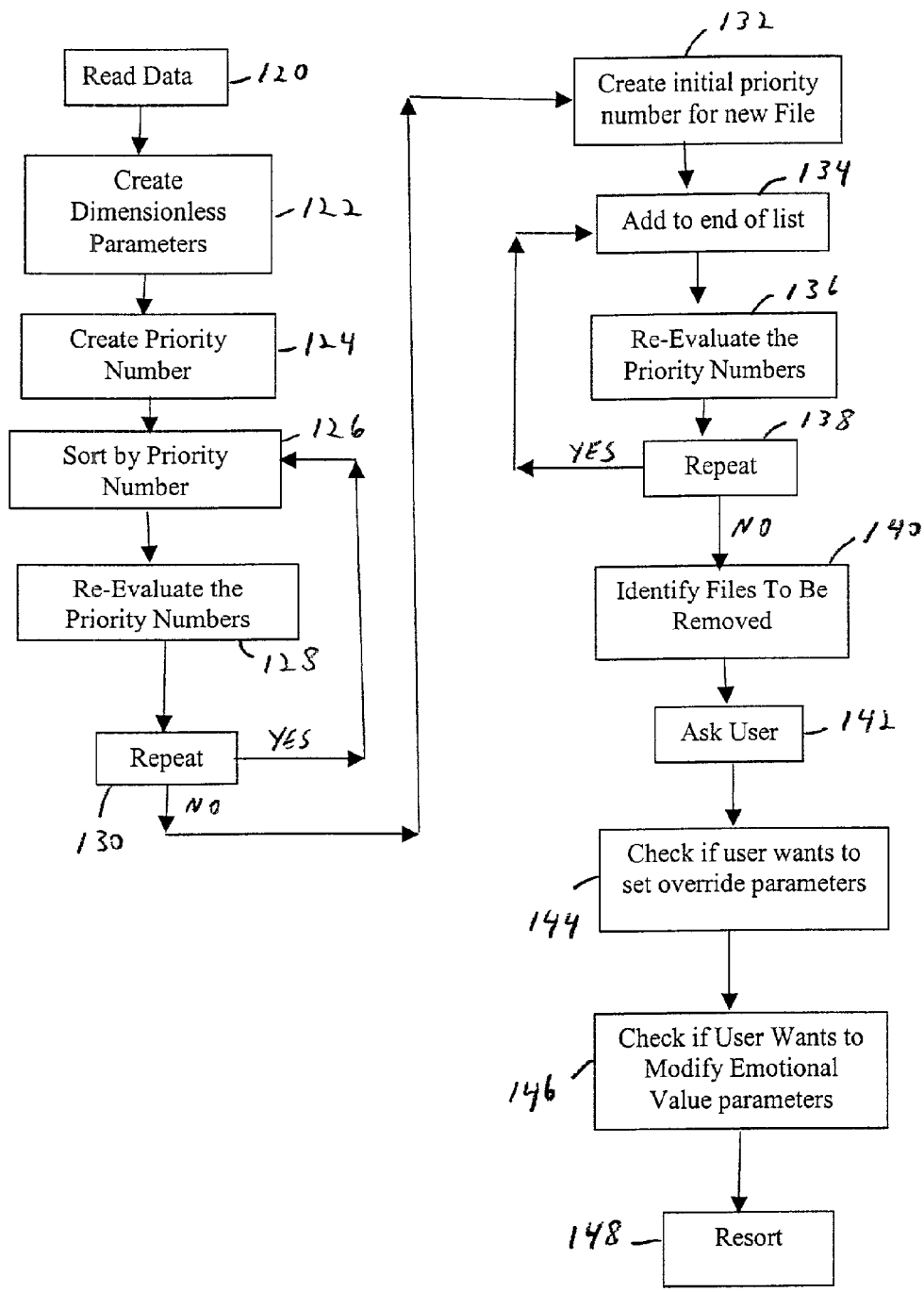
FIG. 11 is a flow chart showing steps of an algorithm illustrating one method of the present invention.

Referring also to FIG. 11, a general algorithm which can be used, and should not be considered as limiting, could includes the following:

Resort existing files (if necessary):
1. Read 120 data information.
2. Create 122 dimensionless parameters with values from [0, 1].
3. Create 124 the priority number as a weighted sum of the parameters.
4. Sort 126 by priority number.
5. Re-evaluate 128 the priority numbers if they can change (e.g. Fi).
6. Run 130 steps 4–5 until priorities converge or a fixed number of runs has been performed.

Add new file (can be done for several files at the same time):
7. Create 132 an initial priority number for new file.
8. Add 134 to end of list, sort by priority number.
9. Re-evaluate 136 the priority numbers if they can change (e.g. Fi).
10. Run 138 steps 8–9 until priorities converge or a fixed number of runs has been performed.

Remove files from end (optional):
11. Identify 140 the files that should be removed.
12. Ask 142 user if files should be removed/back-upped/compressed.
  a. If remove/backup, remove/backup/, add age to queue if deleted or moved.
  b. If compression, show compressed version before having user make decision.
13. (Optional) Check 144 if user wants to set override parameters.
14. (Optional) Check 146 if user wants to modify emotional value parameters.
15. Re-sort 148 the priority list.

The following steps can also be performed to re-evaluate the decay parameter (done occasionally); other implementations are also possible.

16. Bin the age values.
17. Take the logarithms of the bins.
18. Evaluate T0 by least-squares.

The user interface (UI) in existing digital cameras is not particularly suited for defining the emotional value parameter. A simple touch-based UI could be better for several reasons. It allows a highly intuitive way of classifying emotional value. The use of touch forces a user to perform an action to change the value from the default value. In effect, the user is "forced to think", resulting in a meaningful evaluation of the picture. This makes the whole prioritization technique much more meaningful. The visual effects suggested here (such as graying out the bars/buttons if no value has been entered) gives the user a feeling of "reward" for taking the trouble to evaluate the images. This is a simple-sounding event, but can be cognitively extremely significant.

Figure 12:
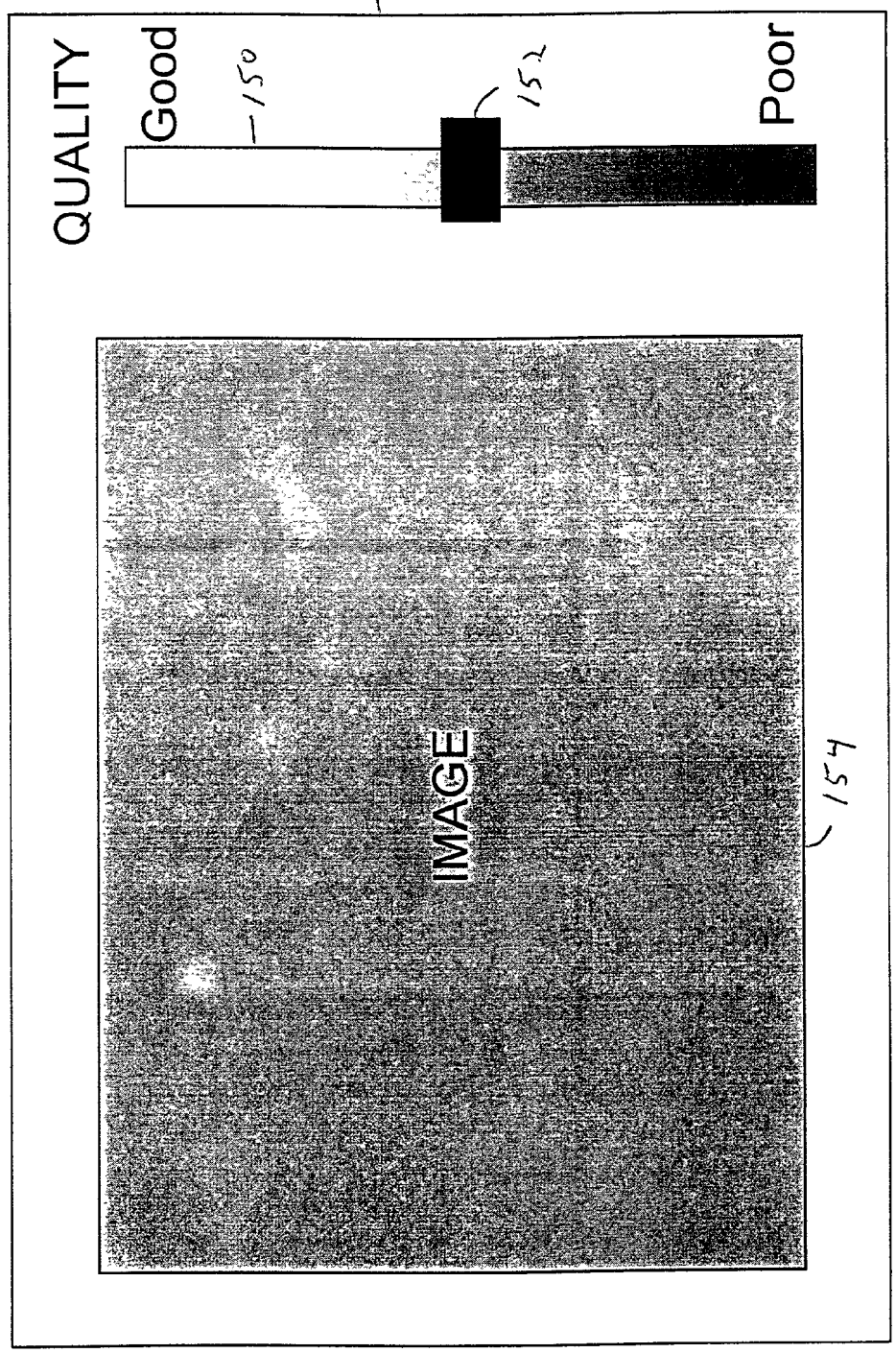
FIG. 12 is a schematic illustration of one type of user interface for use with the digital camera embodiment shown in FIG. 10.
Figure 13:
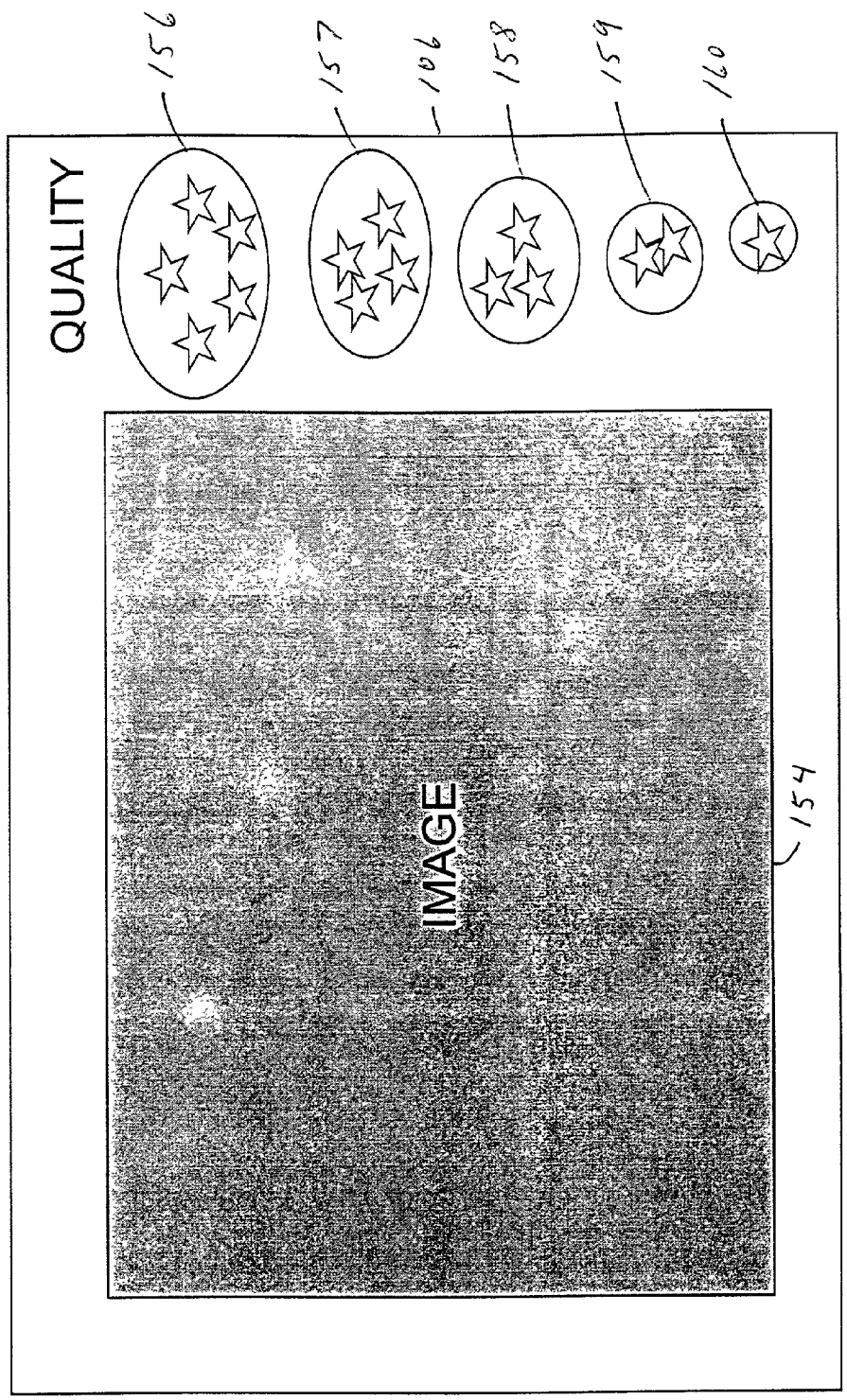
FIG. 13 is a schematic illustration of another type of user interface for use with the digital camera embodiment shown in FIG. 10.

Two possible UI styles are shown in FIGS. 12 and 13. The style in FIG. 12 could be obtainable with a joystick-based terminal or other mechanical type input device. In this case, the bar 150 and slider 152 are drawn on the display 106. The position of the slider 152 relative to the top and bottom of the bar 150 can be adjusted to indicate the quality of the image 154 as perceived by the user. The lower the slider 152 on the bar 150, the poorer the image quality. The higher the slider 152 on the bar 150, the better the image quality of the image 154.

The joystick (not shown) can be used to move the slider 152 up or down until it is in the place the user considers correct. If the user has not given the image a value, the slider 152 should be at the default value (such as 0.5), but in a preferred embodiment, the slider would be grayed out. It would become fully colorful only after the user has actually entered a value. If the slider image is overlaid on the picture image, there is no need to modify the display in any way.

The style in FIG. 13 requires a touch screen and a more refined user interface (UI). However, it can also be implemented by joystick if desired. The user can press one of the keys 156–160 which he feels best expresses the number of "stars" he would give to the image. Again, if the user has not given a value, the buttons should be grayed out.

The present invention could be implemented in any imaging product. It is important to implement the file-control program so that the user preferably remains in final control of it. Although the moving of data from terminal to server could be automatic, it may in practice be preferable to allow the user a degree of control over it. Thus, the user should be asked first and allowed to choose which files he moves (if any). The user can preferably also be able to turn OFF the file-control program at will.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A mobile electronic apparatus comprising:
   a memory comprising a plurality of user stored files therein, each user stored file having more than one different prioritization parameter associated therewith, wherein the user stored files comprise non-operating system files; and
   a system for prioritizing the user stored files in the memory relative to one another, the system comprising means for prioritizing the user stored files relative to each other based upon a priority value established for the files by a combination of at least two of the different prioritization parameters, and wherein the prioritization parameters include a move penalty parameter.

2. A mobile electronic apparatus as in claim 1 wherein the prioritization parameters comprise age of the file and file size.

3. A mobile electronic apparatus as in claim 1 wherein the prioritization parameters include a value judgment parameter entered by a user into the mobile electronic apparatus after the file is stored in the memory.

4. A mobile electronic apparatus as in claim 1 wherein the prioritization parameters include a cost parameter.

5. A mobile electronic apparatus as in claim 1 wherein the prioritization parameters include a user input override parameter.

6. A mobile electronic apparatus as in claim 1 wherein the prioritization parameters comprise an age of file parameter, a file size parameter, a cost parameter, a value judgment parameter, and a user input override parameter.

7. A mobile electronic apparatus as in claim 1 further comprising means for suggesting deletion or moving of one of the files based upon a low prioritization of the file as determined by the system for prioritizing.

8. A mobile electronic apparatus as in claim 1 wherein the mobile electronic apparatus comprises a mobile wireless communication terminal.

9. A mobile electronic apparatus as in claim 8 wherein the mobile wireless communication terminal comprises a digital convergence product.

10. A mobile electronic apparatus as in claim 9 wherein the digital convergence product comprises a digital camera.

11. A mobile electronic apparatus as in claim 9 wherein the prioritization parameters include an image file quality parameter.

12. A mobile electronic apparatus as in claim 1 wherein the prioritization parameters include a file compressibility parameter.

13. A mobile electronic apparatus as in claim 1 wherein the prioritization parameters include a size of free space in the memory parameter.

14. A mobile electronic apparatus as in claim 1 wherein the prioritization parameters include a parameter that lets a user determine what type of a backup of the user stored file is needed.

15. A mobile electronic apparatus as in claim 1 further comprising a user interface, wherein the user interface comprises a touch-based user interface.

16. A mobile electronic apparatus as in claim 15 wherein the touch-based user interface comprises a mechanical input apparatus and, a bar and a slider shown on a display of the apparatus for inputting a user value judgment parameter for one of the files.

17. A mobile electronic apparatus as in claim 15 wherein the touch-based user interface comprises at least one depressible button for inputting a user value judgment parameter for one of the files.

18. A mobile electronic apparatus as in claim 1 wherein the user stored non-operating system files comprise photograph, video and/or music files.

19. A mobile electronic apparatus as in claim 1 wherein the user stored non-operating system files comprise files which are not applications.

20. A mobile electronic apparatus comprising:
    a memory comprising a plurality of user stored files therein, each user stored file having more than one different prioritization parameter associated therewith, wherein the user stored files comprise non-operating system files; and
    a system for prioritizing the user stored files in the memory relative to one another, the system comprising means for prioritizing the user stored files relative to each other based upon a priority value established for the files by a combination, of at least two of the different prioritization parameters,
    wherein the prioritization parameters comprise a time decay parameter as a floating average.

21. A mobile electronic apparatus comprising:
    a memory comprising a plurality of user stored files therein, each of the user stored files having at least one first prioritization parameter associated therewith and a second emotional value parameter associated therewith; and
    a system for prioritizing the user stored files in the memory relative to one another, the system comprising means for prioritizing the user stored files relative to each other based upon both the second emotional value parameter and at least one of the first prioritization parameters for each file.

22. An electronic device comprising:
    a memory comprising a plurality of user stored files therein, each user stored file having more than one different prioritization parameter associated therewith, wherein the user stored files comprise non-operating system files including photograph, video and/or music files; and
    a prioritization system for prioritizing the user stored files in the memory relative to one another, the prioritization system being adapted to prioritize the user stored files in the memory relative to each other based upon a priority value established for the files by a combination of at least two of the different prioritization parameters, wherein the prioritization parameters include a move penalty parameter.

23. An electronic device as in claim 22 further comprising a wireless communication transceiver and an antenna connected to the transceiver, and means for automatically moving the file comprising means for transmitting the file from the mobile electronic apparatus through the transceiver and the antenna to a wireless communication network base station.

24. An electronic device as in claim 22 wherein the electronic device comprises a mass memory device.

25. An electronic device comprising:
a memory comprising a plurality of user stored files therein, each user stored file having more than one different prioritization parameter associated therewith, wherein the user stored files comprise non-operating system files including photograph, video and/or music files; and
a prioritization system for prioritizing the user stored files in the memory relative to one another, the prioritization system being adapted to prioritize the user stored files in the memory relative to each other based upon a priority value established for the files by a combination of at least two of the different prioritization parameters, wherein the prioritization parameters comprise a time decay parameter as a floating average.

26. A mobile electronic apparatus comprising:
a memory comprising a plurality of user stored files therein, each user stored file having more than one different prioritization parameter associated therewith; and
a system for prioritizing the user stored files in the memory relative to one another, the system comprising means for prioritizing the user stored files relative to each other based upon a priority value established for the files by a combination of at least two of the different prioritization parameters, and wherein the prioritization parameters include a move penalty parameter.

* * * * *